US005551991A

United States Patent [19]

Avero

[11] Patent Number: 5,551,991
[45] Date of Patent: Sep. 3, 1996

[54] COMPACT SOLAR ENERGY COLLECTOR

[76] Inventor: Manuel B. Avero, Poligono Costa Sur. Nave 15, 38009 Santa Cruz de Tenerife, Spain

[21] Appl. No.: 379,850

[22] Filed: Jan. 27, 1995

[30] Foreign Application Priority Data

Feb. 7, 1994 [ES] Spain .................................. 9400213

[51] Int. Cl.$^6$ .............................. F24J 2/00; H01L 31/058
[52] U.S. Cl. ........................ 136/248; 126/572; 126/592; 126/646; 126/704
[58] Field of Search ............................. 136/248; 126/572, 126/591–592, 646, 704–709

[56] References Cited

U.S. PATENT DOCUMENTS

| | | | |
|---|---|---|---|
| 4,147,157 | 4/1979 | Zakhariya | 126/586 |
| 5,347,985 | 9/1994 | Bucciarelli | 126/572 |

FOREIGN PATENT DOCUMENTS 3405466  8/1985  Germany ............................. 136/248

*Primary Examiner*—Aaron Weisstuch
*Attorney, Agent, or Firm*—Howell & Haferkamp, L.C.

[57] ABSTRACT

Compact solar energy collector that incorporates into the same housing the collector itself and an accumulator in the shape of a parallelepiped and divided by walls to better withstand water pressure, being then complemented with the remaining conventional elements such as pump, differential thermostat, purges and valves, the housing being fitted with a transparent cover (3) and a heat exchanger inside (13) that is connected to the pump (1) and to the collector (6) and at the other end to valve (11) and lip (10), the rest of the interior of the housing containing insulating material. The water pumping rate is controlled by supplying the pump (1) with electrical power generated by a photovoltaic panel (2) in proportion to the intensity of available sunlight.

3 Claims, 1 Drawing Sheet

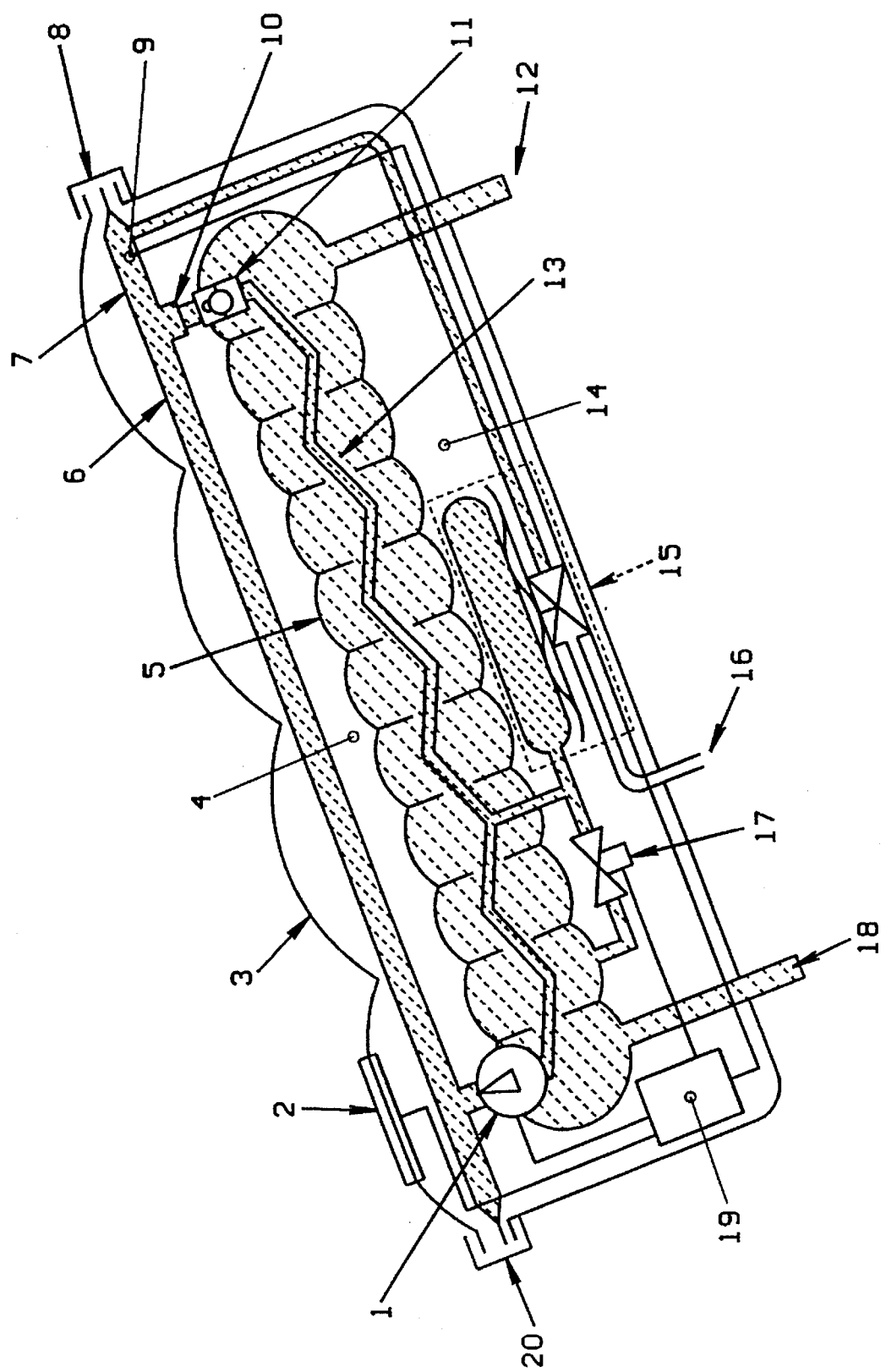

COMPACT SOLAR ENERGY COLLECTOR

FIELD OF THE INVENTION

The invention consists of a compact solar energy collector which main feature resides in incorporating in the same housing the collector itself and the accumulator, which constitutes a clear novelty in relation to this type of collector.

BACKGROUND

The fundamental idea of the integrated system is that inside a unitary housing, formerly enclosing only the collector, and with just a slight increase in depth, there is fitted also an accumulator having an external shape similar to that of a parallelepiped, and as an improvement the housing is divided by walls to better withstand water pressure and further incorporates all the accessories normally fitted to conventional systems, such as the pump, differential thermostat, purging system, and valves.

The advantages offered by the integrated system are as follows:

(A) The first advantage is its performance, since we are dealing first of all with energy saving. There is no energy dissipation due to transfer between the collector and accumulator, as these units are linked by small pipes of just a few centimeters, that remain submerged in the mass of insulating material. Normal units tend to have a few meters of pipe running outside. There is also a considerable energy saving due to there not being an external cylindrically shaped accumulator, the surface of which dissipates energy. Thus the losses due to this reason are substantially reduced compared to those of the usual collector.

(B) The second main advantage is its cost economy. This is due to the fact that only a single housing is used for both collector and accumulator and part of the insulating material is also mounted on common walls.

(C) Another big advantage, and also the most obvious at first sight, is its pleasant aesthetics. A collector, as well as a photovoltaic panel, may lend a modern, environmental and functional outlook to the roof of a house, but it is not the same situation regarding the bulky accumulator.

(D) The biggest advantage is that assembly is guaranteed at the factory and it only has to be connected to the water distribution network. The end user may place it into operation by just linking it to the water inlet pipe and to the distribution outlet.

BRIEF DESCRIPTION OF THE DRAWING

For a better understanding of the purpose of the invention a single drawing figure is attached to this patent specification in which the following main parts are referenced:

1. Pump
2. Photovoltaic panel
3. Transparent cover
4. Insulation material
5. Honeycomb
6. Collector
7. Selective surface
8. Assembly clamp
9. Level detector
10. Crimping lip
11. One way valve
12. Tap water outlet
13. Heat exchanger (primary circuit)
14. Insulation material
15. Three function servo
16. Purge outlet
17. Primary circuit filling valve
18. Tap water inlet
19. Bistable Circuit with liquid level detector
20. Improved housing batten

DETAILED DESCRIPTION

With this construction, the operation progresses as follows:

Tap water enters into the honeycombed deposit (5) through the tap water inlet (18) and exits via the water outlet (12) ready to be used. The water fills the deposit and is prevented from passing through to the primary circuit (13) by the solenoid valve (17). Whenever sunlight falls upon the photovoltaic cell panel (2), it supplies electric current to the bistable electronic system (19) that has two functions, the first one being to use only one photovoltaic panel for the pump and the solenoid valve and the second being to prevent the pump operating empty if the primary circuit is not filled with water. This circuit may not only be built using integrated electronics, it may also be just a simple relay circuit. If the level sensor (9) is not wet, the first thing that the bistable circuit does is to conduct electric current to the solenoid valve, which then opens and lets water flow through the primary circuit, made up by the collector (6), the heat exchanger (13), the pump (1), the three function servo (15), the one way valve (11), and the filling solenoid valve (17), (this may also be a float operated valve). Whenever the water fills up the primary circuit to reach the level detector (9) the bistable circuit (19) supplies the pump (1) with electric current. In the presence of solar radiation, the water inside the collector (6) warms up due to the well known greenhouse effect and at the same time the photovoltaic panel cell (2) supplies electric current to circulate the water. Even though the system also works by convection, the pump (1) improves its performance considerably, and the pump operates at a speed proportional to the amount of solar radiation. If the sun rays are intense, the water warms up considerably and the pump, due to its receiving more electric current from the photovoltaic panel (2), transfers it to the honeycomb (5) faster than it would do if the radiation is less intense. If this is the case, then the pump runs at a lower speed and allows a longer time for the water temperature to rise. Another important function of the pump (1) is opening the one way valve (11). Also whenever the system does not operate such as at night time, the convective flow does not reverse as said valve is safely shut, given that the return convection pressure would be just a few milligrams/cm$^2$, insufficient for a safety mechanism.

The transfer of the energy absorbed by the collector towards the accumulator is through the pump, and just as in any other conventional system, the objective is to keep the hot water inside the honeycomb surrounded by the necessary thermal insulating material. The shape of the flat hot water accumulator is improved, approaching that of an edgeless parallelepipe, as it is manufactured using short cylindrical surfaces, spherical and honeycombed compartments with flat walls, with the main purpose of withstanding pressures without increasing material thickness. Design requirements are reduced by the fact that any part of it, including the walls, be subject only to pure pulling forces, but not to bending or combined forces.

Whenever water expands in the primary circuit, the servo (15) expansion vessel expands within the limits established by the fluid temperature inside said circuit and whenever it cools down it returns to its original position.

As previously described, the operation of the pump forced circulation is proportional to the level of solar radiation. A great advantage over and above conventional systems, wherein the pump starts and stops via a differential thermostat, and the temperature differential may not be high enough (which differential tends to be between 2 and 5 degrees centigrade) for the pump to start, the system shown herein operates whenever the solar radiation has a smaller intensity so as to heat the water and, at the same, operate the circulation pump. Using the conventional differential thermostat system, many low solar radiation days are lost because said radiation has not reached the previously established differential threshold. This is a more important factor on cloudy days, as there are no problems on full radiation days.

Other improvements regarding the conventional primary circuit automatic filling valves is that these work under fluid pressure, so that it is necessary that the fluid circuit withstand a certain level of pressure, and it then becomes necessary to have a certain wall thickness in the systems, but the invention, because it has an electronic liquid level detector, stops filling whenever the liquid level has reached the sensor, that is to say, whenever it is full, so that the circuit may be open to the atmosphere. Another advantage is that because the solenoid valve is actuated by a photovoltaic cell, it operates automatically and whenever the sun shines, but not when it is not necessary.

Another feature providing a great improvement over the prior art is the combination of just one solar panel for operating the circulation pump and automatic filling, with a bistable system, with filling priority, so that if the circuit does not contain water, the pump shall not run empty and whenever the system is full of water, as long as there is solar radiation, the photovoltaic electric current shall cause the pump to circulate the water.

Finally, the lip (10) that incorporates the collector is substantially improved, as the former is strongly seamed to the plate in the successive folds that prevents it from turning and that, because of its design, admits on o-ring seal after being seamed to the plate, from the outside, instead of from the inside, where it would not be accessible.

With the first type of lip, if the joint fails the collector is then useless, which is not the case with the one described above, as it is then only necessary to replace the o-ring seal.

Having sufficiently described the nature of the invention, it is then expressly stated that any modification thereof shall be included within the scope of the claims as long as it does not essentially alter or modify its characteristic purpose.

I claim:

1. A compact solar energy collector, characterized by the collector itself and the accumulator being integrated in one housing unit, the housing unit at its upper portion having a transparent cover of a corrugated shape fixed at its ends using an assembly clamp and a batten, being also internally fitted with a honeycomb divided by vertical walls and fitted with a water inlet and an outlet, as well as a primary circuit of a heat exchanger, which exchanger is at one end connected to a pump and to the collector itself, whereas at the other end it is fitted with a one way valve and a crimping lip joined to the collector, the rest of the inside of the housing unit being filled with insulating material;

the pump being supplied with electrical power generated by a photovoltaic panel and providing a pumping rate dependent upon a level of available solar radiation.

2. A compact solar energy collector as set forth in claim 1 wherein the cover is fitted with the photovoltaic panel which is connected to a bistable circuit with a liquid level detector which is also connected to a primary circuit filling valve that is also connected to a branch of the honeycomb and which branching ends at a three function servo fitted with a purging outlet.

3. A compact solar collector as set forth in claim 1 wherein the collector is fitted with a level detector.

* * * * *